C. B. BARTLEY.
STORAGE BATTERY LAMP.
APPLICATION FILED SEPT. 26, 1911.
1,028,984.
Patented June 11, 1912.
2 SHEETS—SHEET 2.
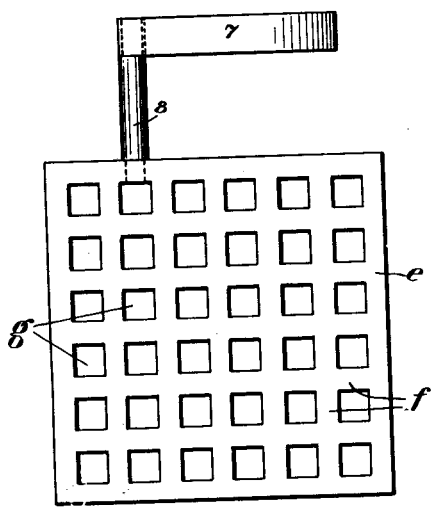
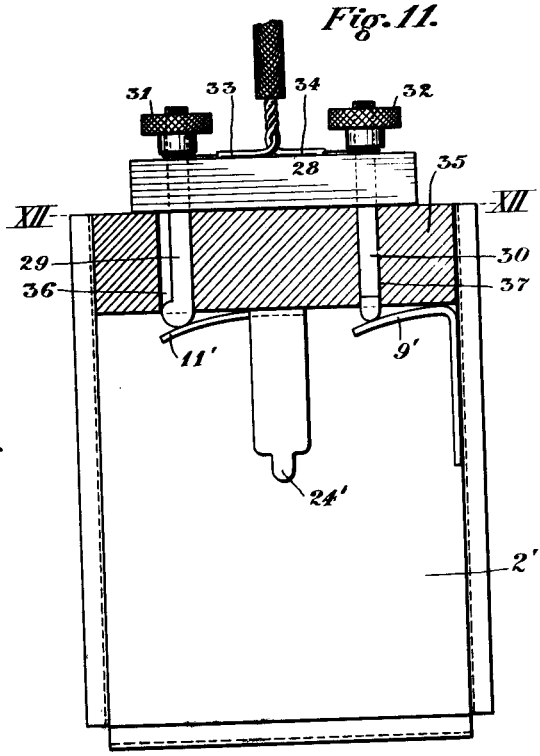
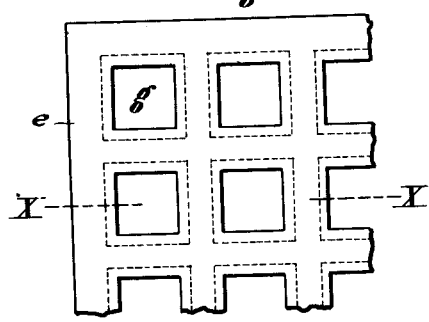
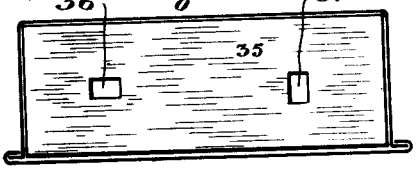
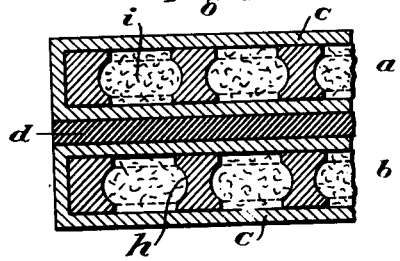
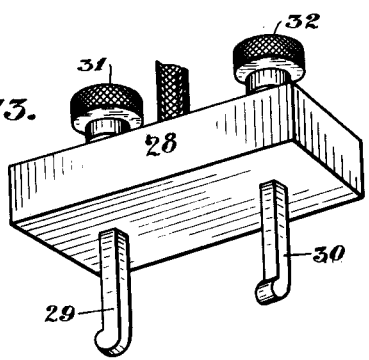
Witnesses:
Inventor:
Charles B. Bartley
by O. M. Clarke
his Attorney

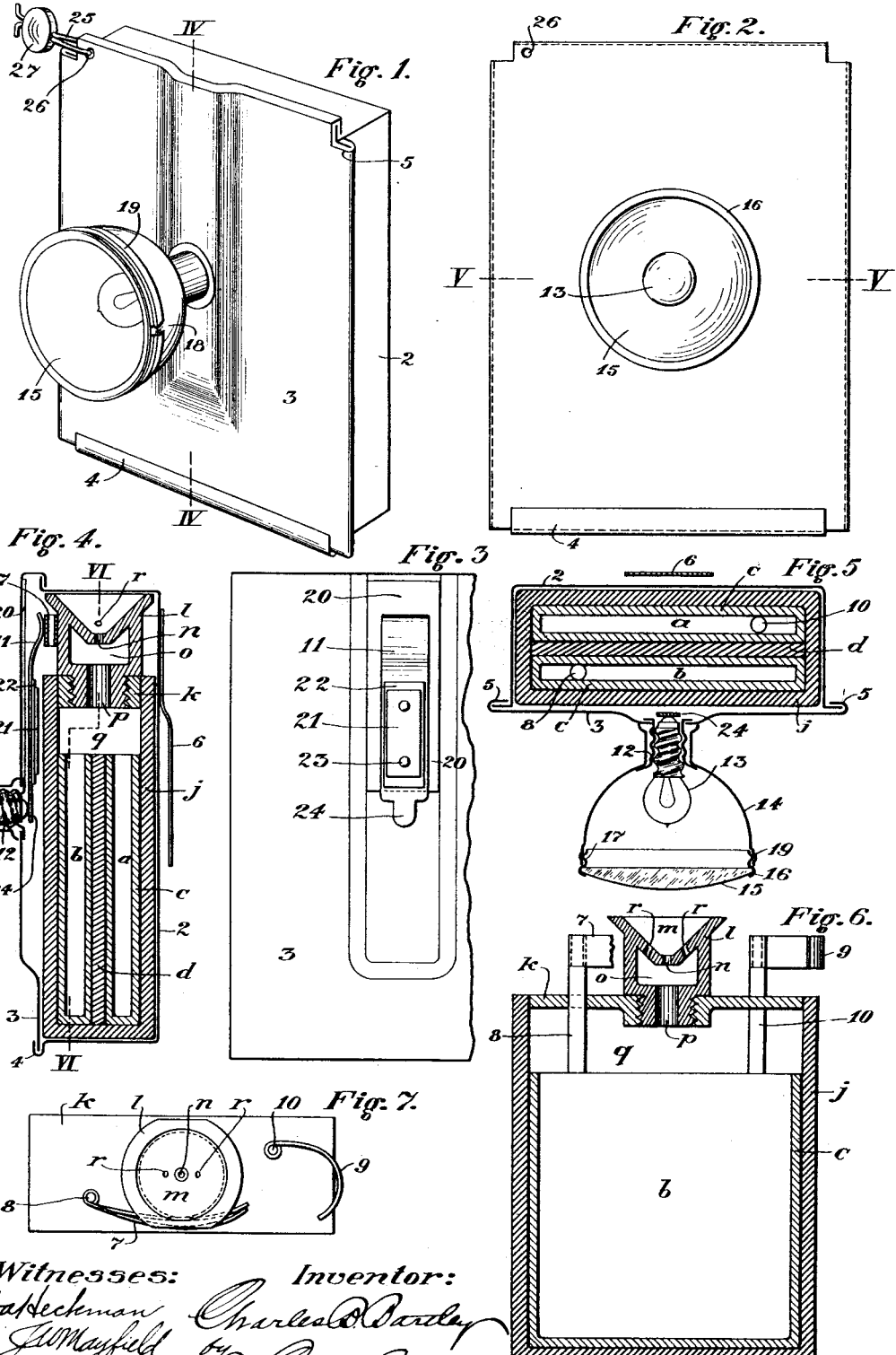

UNITED STATES PATENT OFFICE.

CHARLES B. BARTLEY, OF PITTSBURGH, PENNSYLVANIA, ASSIGNOR OF ONE-HALF TO GEORGE F. RYLANDS AND ONE-FOURTH TO R. H. RUSH, BOTH OF CHARLEROI, PENNSYLVANIA.

STORAGE-BATTERY LAMP.

1,028,984.    Specification of Letters Patent.    Patented June 11, 1912.

Application filed September 26, 1911. Serial No. 651,424.

*To all whom it may concern:*

Be it known that I, CHARLES B. BARTLEY, a citizen of the United States, residing at Pittsburgh, in the county of Allegheny and State of Pennsylvania, have invented certain new and useful Improvements in Storage-Battery Lamps, of which the following is a specification.

My invention consists of an improvement in storage battery lamps and is particularly designed to provide, in a lamp of such character, an improved contact-establishing casing for the battery, a lamp mounted therein, a storage battery of large capacity and minimum weight adapted to be carried within the casing, the entire device being adapted to be supported upon the head, as in the case of a lamp for miners' use, attached to the cap.

The invention comprises the casing, the contact mechanism, the lamp, the battery, and the several features of construction as hereinafter more fully set forth.

The main object of the invention is to provide a light portable casing, lamp, and a battery of such character, capable of being readily inserted and removed from the receiving case for establishing the light current therethrough; of being readily recharged; a case adapted for sealing against unauthorized or improper use or diversion of the current of the battery, while the case itself is also capable of use by connection with a permanent source of current by a slight modification.

In the accompanying drawings: Figure 1 is a perspective view illustrating the storage battery and lamp in its entirety within the inclosing case. Fig. 2 is a face view, in elevation, of Fig. 1. Fig. 3 is a partial inner view of the covering plate, partly broken away. Fig. 4 is a vertical sectional view, indicated by the line IV. IV. of Fig. 1. Fig. 5 is a transverse sectional view on the line V. V. of Fig. 2. Fig. 6 is a vertical sectional view on the broken line VI. VI. of Fig. 4. Fig. 7 is a top plan view of the battery removed from the case and showing the contact springs. Fig. 8 is a view of one side member of the battery plates in elevation, and slightly enlarged. Fig. 9 is a partial detail view of the same on a further enlarged scale. Fig. 10 is a sectional detail view through the active portion of the battery, representing the plates and their associated elements, taken on the line X. X. of Fig. 9. Fig. 11 is a face view of the inner front side of the same showing it provided with a connecting plug and contacts for connection with a permanent source of current. Fig. 12 is a plan view of the case on the line XII. XII. of Fig. 11. Fig. 13 is a perspective detail view of the insertible switch plug.

The outer surrounding case of the battery is made of thin sheet metal 2, in box form, adapted to be mounted in any suitable receiving holder, such as that shown in my companion application filed herewith, or made otherwise for convenient handling or mounting on any suitable support.

The interior of the casing is closed by a slidably mounted front 3, the lower edge of which fits within a receiving lip or recess formed by flanging the lower side of the case 2, as indicated at 4, while the cover itself has a sliding engagement with the front edges of the case at each side, as at 5.

In addition to the mounting of the box or casing within the holding receptacle in which it is placed, the rear portion of the case is also preferably provided with a tongue 6 of thin sheet metal adapted to interfit within a retaining cleat, and said tongue may also be employed for attaching the casing and its contents, including the lamp, as shown, to any other desired support, if desired.

Within the casing is inserted the battery hereinafter described. For the purpose of making contact with the consuming element, as the lamp, the positive plate of the battery is provided with a contact terminal 7 which extends across in front of its upper portion, being connected with the positive plate $b$ by a suitable stud or post 8, while a similar spring contact 9 is connected with the negative plate $a$ by a similar stud or post 10.

Spring 7 is preferably double, as shown, providing ample resiliency and insuring good contact with the spring contact member 11 secured in the inner side of the front cover 3. Springs 7 and 9, each having sufficient spring tension to insure contact, are of any suitable conducting material as phosphor bronze, vanadium, or any non-corrosive conducting metal. They are secured to the conducting post 8 or 10 by brazing or sweating thereto. Into the middle front portion of the front cover 3 which is longitudinally extended vertically of its middle portion for clearance of the contact member 11, is a lamp socket 12, into which is screwed the base of an electric lamp 13. Outwardly beyond said socket 12 extends the semispherical lamp casing 14, of thin sheet metal, in the outer portion of which is the lens 15. Said lens is fixedly secured in an annular rim 16 having oppositely located outwardly pressed projections 17, adapted to register with entrance openings 18 in the receiving periphery of the shell 14, in the manner of a bayonet joint. By thus inserting the lens holder and giving it a quarter turn, the lens is fixedly held by the annular retaining channel 19, as clearly shown in Figs. 1 and 5. The contact spring 11, which is bowed inwardly to make contact with the spring 7, is mounted in the vertical central channel of the front 3 and completely insulated from the plate by a piece of fiber or other insulating material 20, placed underneath the contact 11. An outer cleat 21, which secures spring 11 in place, is insulated from said contact 11 by a thin piece of insulation 22, preventing electrical connection through the rivets 23, and as thus mounted the contact 11 is completely insulated from the front plate. At its lower end contact member 11 is provided with a contacting terminal 24 which normally engages the inner end of the lamp socket, establishing circuit with one terminal of the filament. The other terminal is in electrical communication with the metallic front 3 through the socket engagement of the lamp, and thence to the entire main outer casing 2. The other spring 9 of the battery makes rubbing contact with the side of the casing, when inserted, thereby establishing electrical connection between the active portions of the battery and the lamp, when the battery is inserted in the case 2, and the cover 3 is placed upon it. By this means I positively establish the circuit entirely within the casing, rendering it impossible to open or close the circuit from the exterior.

For the purpose of effectually preventing unauthorized removal of the cover 3, it is fixedly connected with the upper front flange of the case 2 by means of a wire 25 passed through apertures 26 in the front and body parts of the case respectively, the said wires then being connected by a suitable seal 27 of well-known construction.

The battery A is shown in sectional Figs. 4, 5 and 6 and in plan in Fig. 7, while one of the grids is illustrated in detail in Figs. 8, 9, and 10. The active portion of the battery is composed of a pair of plates or grids, $a$ representing the negative plate and $b$ the positive plate. Each of said plates is incased within a covering of chemically treated paper $c$ hermetically sealing the plate, while between the thus incased plates is a separator $d$ of chemically treated wood forming an electric gap. One of the objects of such covering and spacing is to provide separation of one of the plates from the other, while also providing for resiliency and cushioning to oppose crushing of any of the usual strains to which such a battery is subjected in charging or recharging.

Each plate $a$ and $b$ is in the form of a rectangular frame (Fig. 8) of lead or lead alloy, provided with outer frame members $e$ and transverse cross bars $f$ forming the series of checker work cavities $g$ throughout the entire body of the plate. The inner sides of each cross bar surrounding each cavity $g$ are recessed as at $h$ providing anchoring engagement with the active material $i$ of the battery. By this means numerous adjacent cubical cavities for the active material are provided, separated by the several cross bars $f$, and a very large area of the metallic plate is exposed to the active material.

The plates, as thus constructed and incased, are inserted within a case $j$ of hard rubber or other suitable material, the top of which is sealed by a cover $k$. Said cover is provided with a filler cap $l$ screwed into the top, as shown, and provided with a funnel opening $m$ leading by a central aperture $n$ of about 1/16 inch diameter into the interior opening $o$ from whence, by a port $p$ communication is had with the upper interior $q$ of the case $j$ above the plates. At each side of aperture $n$, perforating the inclined walls of the funnel $m$ at angles of about 35° to the vertical, are reduced openings $r$ of about 1/32 inch diameter. The object of the funnel as thus made is to facilitate charging the unoccupied interior space $q$ of the case $j$ with the electrolytic liquid and to prevent its outflow should the battery become inverted or tipped.

The electrolyte is of such consistency that it assumes a somewhat solid formation during discharging action of the battery, and becomes liquid during the charging operation. If, while in liquid form, the battery is inverted, the liquid will be prevented from escaping through the central charging opening $n$ in the apex of the cone or the lower reduced openings $r$ on account of the retarding suction action.

In Fig. 11 the case 2' is constructed in the same manner as the case above described and is provided with the front or cover having the lamp. However, when a secondary battery is not employed, connection is had with a source of current by means of a plug 28 having contact keys 29, 30, adapted to make contact with the spring 11' of lamp contact 24' and spring 9' attached to the case for establishing current to the lamp therethrough, in the same manner as described. The keys 29, 30, are secured in plug 28 and by binding post terminals 31, 32, with conducting wires 33, 34. A block 35 is secured in the upper portion of the case having transverse openings 36, 37, for passage of keys 29, 30, and the terminals of said keys are widened in different directions, as shown, as are also the passage openings 36, 37. In other words, the holes and key terminals do not match universally. By this construction it is impossible to insert the keys improperly, thereby insuring proper polarity of the current, due to the registering of each key with its particular hole only.

The battery and case as a whole, as thus constructed, are very compact, light and portable and capable of being used for current for a comparatively long period of time.

The device as a whole is strong and serviceable, simple in construction and efficient, while the case is adapted for use with either the inserted storage or secondary battery, or with a permanent source of current as by the plug connection of Figs. 11, 12 and 13.

What I claim is:

1. An electric lamp case of sheet metal having a removable front, an electric lamp therein, a spring contact for establishing current through the case to the lamp socket, and a spring contact secured to the removable front for making connection with the end of the lamp socket, substantially as set forth.

2. In a lamp, the combination with an inclosed battery, of a sheet metal case, a sliding front provided with an electric lamp socket in series circuit with the front and body of the case and the battery, and a spring contact device on the inner side of the sliding front adapted to engage the center of an electric lamp in said socket and to make connection with the battery, substantially as set forth.

3. In a lamp, the combination of a sheet metal case, a slidingly mounted front provided with a lamp socket and lamp and having a contact spring, and a battery within the case having terminal contact springs adapted to engage said contact spring and the side of the case respectively, substantially as set forth.

4. A battery casing of sheet metal having a removable front provided with a lamp socket, an insulated spring contact secured on the inner face of the front and adapted to make contact with the lamp base and having an opposite contact terminal, and means for connecting said terminal and the metal of the case with a source of current, substantially as set forth.

5. A lamp battery casing of sheet metal having a slidably attached front in interfitting engagement with the edge portions of the casing and provided with a lamp socket and an insulated contact spring therefor arranged lengthwise of the front in the line of its movement, substantially as set forth.

6. A lamp battery casing of sheet metal having a slidably attached front in interfitting engagement with the edge portions of the casing and provided with a lamp socket, and an attached insulated contact spring having opposite resilient terminals adapted to engage a current terminal and lamp terminal respectively, substantially as set forth.

In testimony whereof I hereunto affix my signature in the presence of two witnesses.

CHARLES B. BARTLEY.

Witnesses:
C. M. CLARKE,
FREDK STAUB.